US010938916B2

United States Patent
Enat et al.

(10) Patent No.: US 10,938,916 B2
(45) Date of Patent: Mar. 2, 2021

(54) METHODS CIRCUITS DEVICES SYSTEMS AND FUNCTIONALLY ASSOCIATED COMPUTER EXECUTABLE CODE FOR FACILITATING EDGE COMPUTING ON A MOBILE DATA COMMUNICATION NETWORK

(71) Applicant: SAGUNA NETWORKS LTD., Yokneam Illit (IL)

(72) Inventors: Barak Enat, Haifa (IL); Daniel Nathan Frydman, Haifa (IL)

(*) Notice: Subject to any disclaimer, the term of this patent is extended or adjusted under 35 U.S.C. 154(b) by 0 days.

(21) Appl. No.: 16/243,264

(22) Filed: Jan. 9, 2019

(65) Prior Publication Data

US 2019/0387062 A1    Dec. 19, 2019

Related U.S. Application Data

(63) Continuation-in-part of application No. 15/331,853, filed on Oct. 22, 2016.

(60) Provisional application No. 62/615,027, filed on Jan. 9, 2018, provisional application No. 62/244,747, filed on Oct. 22, 2015.

(51) Int. Cl.
*H01L 29/08* (2006.01)
*H04L 29/08* (2006.01)
*H04W 36/08* (2009.01)

(52) U.S. Cl.
CPC .......... *H04L 67/148* (2013.01); *H04L 67/141* (2013.01); *H04W 36/08* (2013.01)

(58) Field of Classification Search
CPC ..... H04L 67/148; H04L 67/141; H04L 67/10; H04W 36/08; H04W 36/10; H04W 88/14
See application file for complete search history.

(56) References Cited

U.S. PATENT DOCUMENTS

| 2005/0083931 A1* | 4/2005 | Blair | H04L 45/125 370/389 |
| 2007/0150602 A1* | 6/2007 | Yared | H04L 67/1017 709/227 |

FOREIGN PATENT DOCUMENTS

EP    3355615 B1 *   8/2019   ............ H04W 36/18

* cited by examiner

*Primary Examiner* — Kiet Tang

(57) ABSTRACT

Disclosed are methods, circuits, devices, systems and functionally associated computer executable code to Facilitate Edge Computing on a mobile communication network. According to some embodiments, there may be provided a mobile data communication network comprising two or more Mobile Edge Computing MEC Zones, wherein a first MEC Zone is communicatively coupled to a first set of network access points which are adapted to communicated with User Equipment (UE) and includes at least one Edge Processing Host adapted to run a server-side application accessible to a client application running on an EU communicating with a network access point of the first set of network access points. The network may include an Edge Processing Connectivity Manager ("EPCM") to provide application session continuity for the client application and the server-side application when the UE switches its network connection from an access point of said first MEC zone to an access point communicatively coupled to an access point coupled to a second MEC zone.

8 Claims, 7 Drawing Sheets

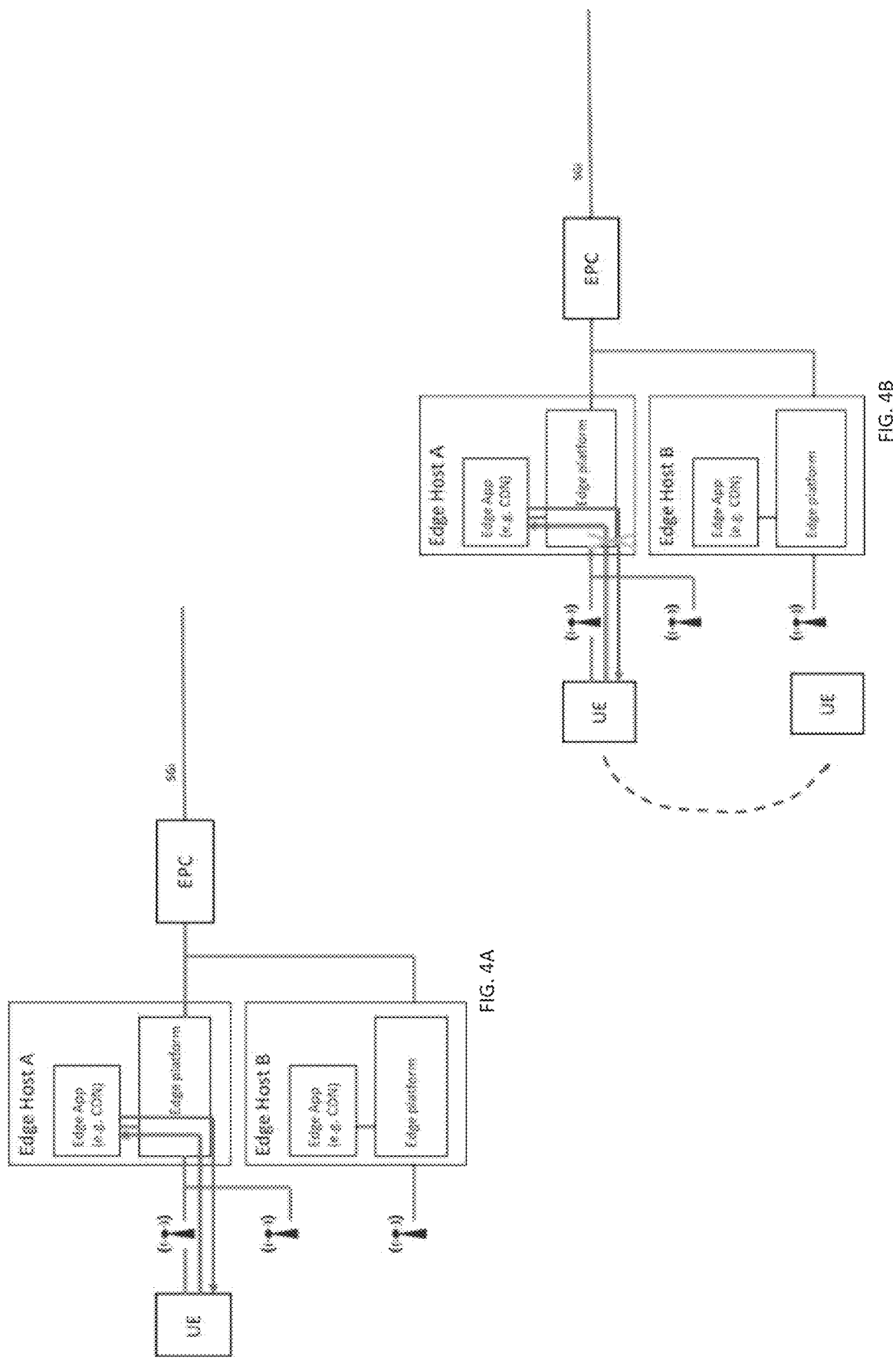

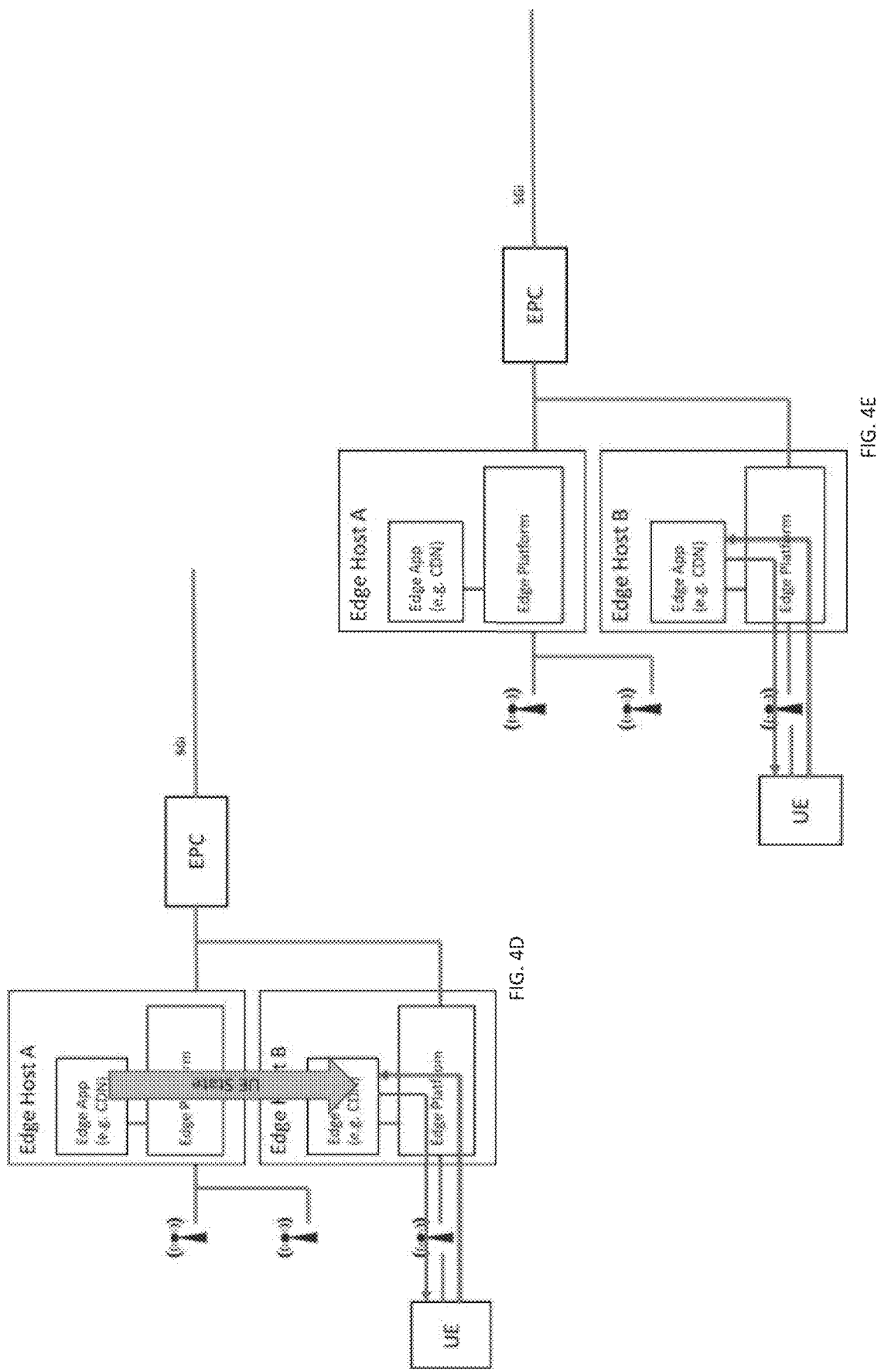

METHODS CIRCUITS DEVICES SYSTEMS AND FUNCTIONALLY ASSOCIATED COMPUTER EXECUTABLE CODE FOR FACILITATING EDGE COMPUTING ON A MOBILE DATA COMMUNICATION NETWORK

RELATED APPLICATIONS

The present applications claims priority from U.S. Provisional Patent Application No. 62/615,027, filed on Jan. 9, 2018 and the disclosure of which is hereby incorporated by reference in its entirety. The present application is a continuation-in-part of U.S. Utility patent application Ser. No. 15/331,853, filed on Oct. 22, 2016, which claims the benefit of U.S. Provisional Patent Application No. 62/244,747, filed on Oct. 22, 2015, and the disclosures of which are hereby incorporated by reference in their entirety.

FIELD OF THE INVENTION

The present invention generally relates to the field of wireless communication. More specifically, the present invention relates to methods, circuits, devices, systems and functionally associated computer executable code for facilitating edge computing on a mobile data communications network.

BACKGROUND

Mobile Edge Computing (MEC) is a new concept in Software Defined Networking and Virtualization Technology. The MEC paradigm relates to moving computational and storage resources from the core of an access network or from outside the network to an edge of a mobile (access) network and enabling mobile communication/computing devices, also referred to as User Equipment ("UE"), to connect to server type applications running on the edge located resources through a Mobile (Network) Breakout (FIG. 1A). Edge located resources, with or without the relevant breakout switching, and or the server type applications running thereon, can optionally be referred to as MEC platforms. Applications running or otherwise residing on the MEC platforms can optionally be running in a VM environment or in computational containers.

When a client application running on a specific UE is engaged in a communication session, through a specific wireless access point of the network, with an application running on a specific MEC platform functionally associated with the specific wireless access point, the mobile nature of the UE may lead to the UE communicatively disconnecting from the specific wireless access point during the client application communication session being disrupted (FIG. 1B). When a UE physically moves through a coverage area of a mobile network, it may transit across coverage areas of different wireless access points. Two wireless adjacent access points may be associated with either the same or with different MEC zones. Accordingly, when a UE's connection the access network transition from one access point to another, such as during a connection handed, the UE might transit from one MEC zone to another different MEC zone. When a UE moves between MEC zones, the UE's IP address might change within the new MEC zone, for example due to NAT issues.

If, as a result of a transition between two access point coverage areas, a UE disconnects from a first access point and communicatively couples to a second wireless access point of the network, for example as part of a handover process performed by a control unit of the network, the client application on the UE may attempt a reconnection to the server application. But if the two access points are, however, associated with different MEC zone's, the reconnection request will not succeed. If the second wireless access point to which the UE is handed over to is part of, or otherwise associated with, a different MEC zone, at best a new communication session with a different instance of the server application running on a different MEC platform will be started. At worse, data in the old communication session will be lost and possibly a new session may not be started with the new server application.

There is a need in the field of wireless data communication for methods and systems to preserve communication session continuity between UE client applications and MEC hosted server applications, including during mobility or transitioning the UE between MEC zones. There is a need to provide a transparent reconnection for a UE's client application's communication session with a edge hosted server application when the UE is transiting or transitioning between two access points associated with different MEC zones. It is also desirable to provide reconnection of a session between a UE client application and an edge server application transparently on all layers, such as IP, TCP and Applications.

SUMMARY OF INVENTION

The present invention includes methods, circuits, devices, systems and functionally associated computer executable code for facilitating edge computing on a mobile data communication network. Embodiments of the present invention relate to Edge Computing, Software Defined Networking and Virtualization Technology. Embodiments of the present invention include features facilitating mobility of mobile communication devices (UE's) across MEC zones of access communication networks having computing and storage resources residing, or otherwise operating, at the edge of the access network. The present invention may include features for connecting UE's to server applications residing/operating on an edge computing platform, optionally running in Virtual Machine's, Containers or Unikernels.

Embodiments of the present invention may include methods and systems to transparently resetting an existing communication session between a client application running on UE and a server application running on computing resources of a MEC zone, while causing the UE application client to reopen a new session with a server application running on computing resources of another MEC zone. Optionally, the present invention provides for the UE to continue the previous session with an application instance located on the new edge computing resources in the new MEC zone. Optionally, a reconnection of the session between the UE client application and the different server application, and or application instance, may be performed transparently on all layers (e.g. IP, TCP and Applications). Embodiments of the present invention include features and steps enabling a client application running on a UE connected to a first server application and running a TCP or UDP session to preserve functionality when a user of the respective UE is moving in the mobile network from one edge computing zone into a different edge computing zone.

According to embodiments, there may be provided a mobile data communication network and communication network architecture including one or more Mobile Edge Computing ("MEC") zones, wherein at least one of the MEC zones may be associated with one or more network access points and may also include or be otherwise associated with at least one Edge Processing Host (EPH) as referred to Edge Host. EPH's may include computational and communication resources and may be adapted to provide resources required for the execution one or more server applications, which server applications may provide application services to client (side) applications running on client devices (UE's) communicatively coupled to an access point within the EPH's respective MEC zone. The present invention may include methods, devices, systems and computer executable code to provide a client application running on a mobile communication device (UE), and communicating with a server-side application (e.g. application engine) running on an EPH within a first MEC zone of the mobile data communication networks, with server-side application session continuity as the mobile communication device moves or otherwise switches from the first MEC zone of the mobile data communication network to a second MEC zone of the mobile data communication network.

In order to support session continuity of client applications running on UE's crossing between MEC zones with different EPH's, one or more MEC zones may include or be functionally associated with a mobility services module. Each MEC zone's mobility services module may run on the MEC zone's respective EPH or on some other functionally associated computation resources. Each MEC zone's mobility services module may be able to communicate with at least some other MEC's mobility services module. According to some embodiments, a mobility services module may have access to application session information of at least some of the server applications running on a respective corresponding EPH in the same MEC zone. According to further embodiments, a Mobility Services Module may have access and or control of applications and application session information of at least some server applications running on a respective corresponding EPH. For example, a Mobility Services Module according to embodiments of the present invention may have the ability to: (a) copy application session information (e.g. application state values and session client application communication parameters); (b) terminate an application session with a specific client application; and (c) trigger or instance new application sessions with specific state values and client application communication parameters.

An MEC Zone's Mobility Services Module may be integral or otherwise functionally associated with the zone's Edge Platform, which Edge Platform may be integral or otherwise functionally associated with the zone's EPH, also referred to as an Edge Host of the MEC zone. Mobility Services Modules residing at different MEC zones may communicate with one another, for example through a cross MEC zone gateway. Several Mobility Services Modules residing in different MEC zones may collaborate in the transfer of application sessions between server applications hosted on EPH's of the different MEC zones. Mobility Services Modules may coordinate an orderly and transparent transfer of a UE client application's communication session between two separate server applications running on separate EPH's in different MEC zones.

Mobility Services Module according to embodiments of the present invention may be integral or otherwise functionally associated with an Edge Processing Connectivity Manager (EPCM). An EPCM according to embodiments of the present invention may be formed of some combination of Edge Host or Edge Platform services (e.g. computing and packet routing functionality) and Mobile Services Module logic for server application session management. According to further embodiments, an EPCM may reside on a single network appliance, while according to other embodiment the EPCM may be a distributed logical network entity, or virtual appliance, formed or composed of functional portions of each of multiple Mobile Services Modules and multiple Edge host services located in different MEC zones of the network and collaborating with each other to facilitate transparent UE client application switching between server applications residing in different MEC zones of the network.

A mobility services module according to embodiments of the present invention may, alone or with resources of an associated EPCM, monitor access network control signaling between a communicatively coupled UE and a network control element in order to detect when a specific communicatively coupled UE with a client application communicating with an associated EPH server application is about to handover to another access point (e.g. base-station). If the UE is being handed over to an access point associated with a different MEC zone, the Mobility Services Module of the first MEC zone, alone or with support of EPCM services, may determine to which new MEC zone the UE is about to handover. Optionally, the Mobility Services Module of the first MEC zone may contact a Mobility Services Module in the new MEC zone and may coordinate transfer of active application session state information relating to an application session in which the leaving UE's client application is engaged with a server application in the current MEC zone. Along with the state information, the Mobility Services Module may also transfer one or more UE client application designator in order to enable an server application running on a EPH in the new MEC zone to connect with the moving UE's client application. The collaborative transfer of session state and client identifier information may enable the server application in the new MEC zone to connect with the client application and pick-up the active application session where the server application in the previous MEC zone left off. More generally, application session continuity for client side applications on UE moving between MEC zones may be maintained by transferring server-side application session data, such as session state data, from a first EPH in the first MEC zone to a second EPH in the second MEC zone.

According to some embodiments, each of two or more network access nodes of a mobile data communication network may be located within, or be otherwise associated with, an Mobile Edge Computing (MEC) zone and may be integral or otherwise functionally associated with at least one Edge Processing Host (EPH) which EPH is part of that MEC zone. A mobile data communication network according to embodiments may include multiple MEC zones, each MEC being associated with a separate set of wireless network access points, which wireless access points may be cellular base stations or Wi-Fi hotspots. Each MEC zone according to embodiments of the present invention may be integral or otherwise functionally associated with a separate set of EPH's, wherein an EPH may be or may include computational resources or a platform including one or more processors, computational memory, and an operating system running a single server at a time, or the computational platform may include an operating system adapted to host multiple virtual servers (e.g. virtual machines) and/or multiple processing containers at the same time. According to yet further embodiments, an EPH may include multiple computational platforms operating in concert (e.g. a grid computer). An EPH, either running a single server (Machine) operating system or running a virtual machine hypervisor (e.g. VMWare) with multiple virtual machines (e.g.

virtual servers) instanced/running thereon, may also be referred to as a Mobility Edge Computing Platform (MECP). A server operating system or a virtual machine/server running on an EPH of a specific MEC, according to embodiments, may be referred to as an MEC server.

An EPH according to embodiments may include computational resources such as operating memory, digital processing circuits, and data connectivity circuits for running one or more server-side applications, and may be adapted to allocate at least a portion of its computational resources to application engines or application servers to be accessed through the mobile data communication network. An EPH within a mobile data communication network according to embodiments may have data connectivity to and with other EPH's in the same MEC zone, to and with EPH's in other MEC zones, and with generic network resources across the internet. Client application access to a specific EPH and server-side applications (e.g. application engines) running thereon may be restricted to client applications running on UE's communicatively coupled to an access point associated with the MEC zone of the specific EPH. An MEC zone specific DNS associated with a specific MEC zone may cause connection requests from MEC zone connected UE, for connections to external server applications, to be routed to local instances of those server application host on an EPH of the same specific MEC.

According to further embodiments, application session continuity for a client application running on an UE which is switching from a first MEC zone to a second MEC zone may be maintained by transferring a corresponding server-side application session from a corresponding server-side application running on an MEC server of the first MEC zone to a corresponding server-side application running on an MEC server of the second MEC zone. The corresponding server-side application session may be transferred by copying session state data from the application running on the first zone MEC server and instancing or otherwise creating another session with the copied session state data on an MEC server of the second zone. According to yet further embodiments, a snapshot of the entire first zone server-side application (or container) may be copied and instanced on an MEC server of the second zone. These application session transfers may be achieved through a collaborative series of steps performed by Mobility Service modules running on EPH's within the first and second MEC zones.

A server-side application or application engine running on an EPH which is functionally associated with a given network access point may be accessible and may provide data services to a corresponding or otherwise associated client application which is running on a mobile communication device communicatively coupled to the mobile data communication network through the given network access point. According to some embodiments of the present invention, the network may include an Edge Processing Connectivity Manager ("EPCM") adapted to provide session continuity for a client application running on a mobile communication device which is moving or otherwise switching between two network access points, when each network access point is associated with a different MEC and separate EPH's. The EPCM may: (a) reroute communication between the client and server; (b) shift the application session data (e.g. state and client ID) to the MEC zone; and (c) some combination of the two.

According to some embodiments, the EPMC may be a discrete and/or centralized network resource, network element or set of network elements, such as one or more network appliances connected to the network. According to further embodiments, the EPMC may be decentralized and may be comprised of Mobility Services modules running on portions of each of multiple EPH's which are spread across different MEC zones. For example, at least one Mobility Services module may be located at each MEC zone which participates in a MEC zone group supports server application session continuity, and the Mobility Services modules from each MEC zone of the MEC zone group may communicate with at least one other Mobility Services module located at another MEC zone. According to further embodiments, each Mobility Services module of any MEC zone may communicates with each other Mobility Services module of each other MEC zone within the same MEC zone group. The communication may be in the form of TCP/IP packet transmission to a specific Mobility Services module, a packet unicast to a specific Mobility Services module, and/or a multicast to several or all of the Mobility Services modules of an MEC zone group. Communication between Mobility Services module of different MEC zones may provide for a collaborative computing configuration supporting application session continuity for applications running on UE which is switching between two MEC zones according to embodiments of the present invention.

According to some embodiments, session continuity may be provided and/or maintained for a client application running on an EU which switched its connection to the network between a first access point associated with a first MEC zone and to a second access point associated with a second MEC zone, by reconnecting the client running on the UE to the original application running over the original MEC server of the first MEC zone from the new MEC server of the second MEC zone. The reconnection between the UE and the Application on the MEC server of MEC zone may be performed transparently on all layers (IP, TCP and Applications). As an UE switches its network connection, and server-side application data service requests from client applications running on the UE, to the second MEC zone, a Mobility Services module of the second MEC zone may recognize that server-side application data service requests from the client application running on the newly connected EU are relevant to a server-side application running on an MEC server of a different MEC Zone. The Mobility Services module may transmit a query to one or more Mobility Services modules running in other MEC zones to determine whether and/or which of the MEC servers in the other zones is running the relevant application. Upon receiving an indication and/or a network address of the relevant MEC server, the Mobility Services module in the new MEC zone may forward or otherwise bridge communication from the client application on the UE with the relevant MEC server on in the other MEC zone. Bridging application session packets between the two MEC zones may be performed using Mobility Services modules in both MEC zones as gateways and/or Network Address Translators (NAT) for data packets of the application session. Data communication between the two Mobility Services modules, including signaling packets and payload data such as application session packets, may be communicated using a data tunnel connecting the two modules.

Embodiments of the present invention, including structure, steps and functions described herein, are applicable to all cellular networks known today or to be device in the future. Embodiments of the present invention, including structure, steps and functions described herein, are applicable to wireless data networks known today or to be device in the future. Embodiments of the present invention, including structure, steps and functions described herein, are applicable to satellite data networks known today or to be device in the future.

Application session continuity may also be maintained by bridging application session data communications between the second MEC and the first MEC zones, thereby maintaining connectivity or reconnecting the client application running on the UE communicatively coupled to the second MEC zone with the server-side application running on an EPH in the first MEC zone.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4A & 4B are functional block illustrations of an exemplary transition phases of a UE from a first MEC zone of an exemplary network in accordance with embodiments of the present invention to a second MEC zone of the exemplary network;

FIGS. 4D & 4E are functional block illustrations of an exemplary reconnection phase of a UE from a first MEC zone of an exemplary network in accordance with embodiments of the present invention to a second MEC zone of the exemplary network;

Figure 1A:
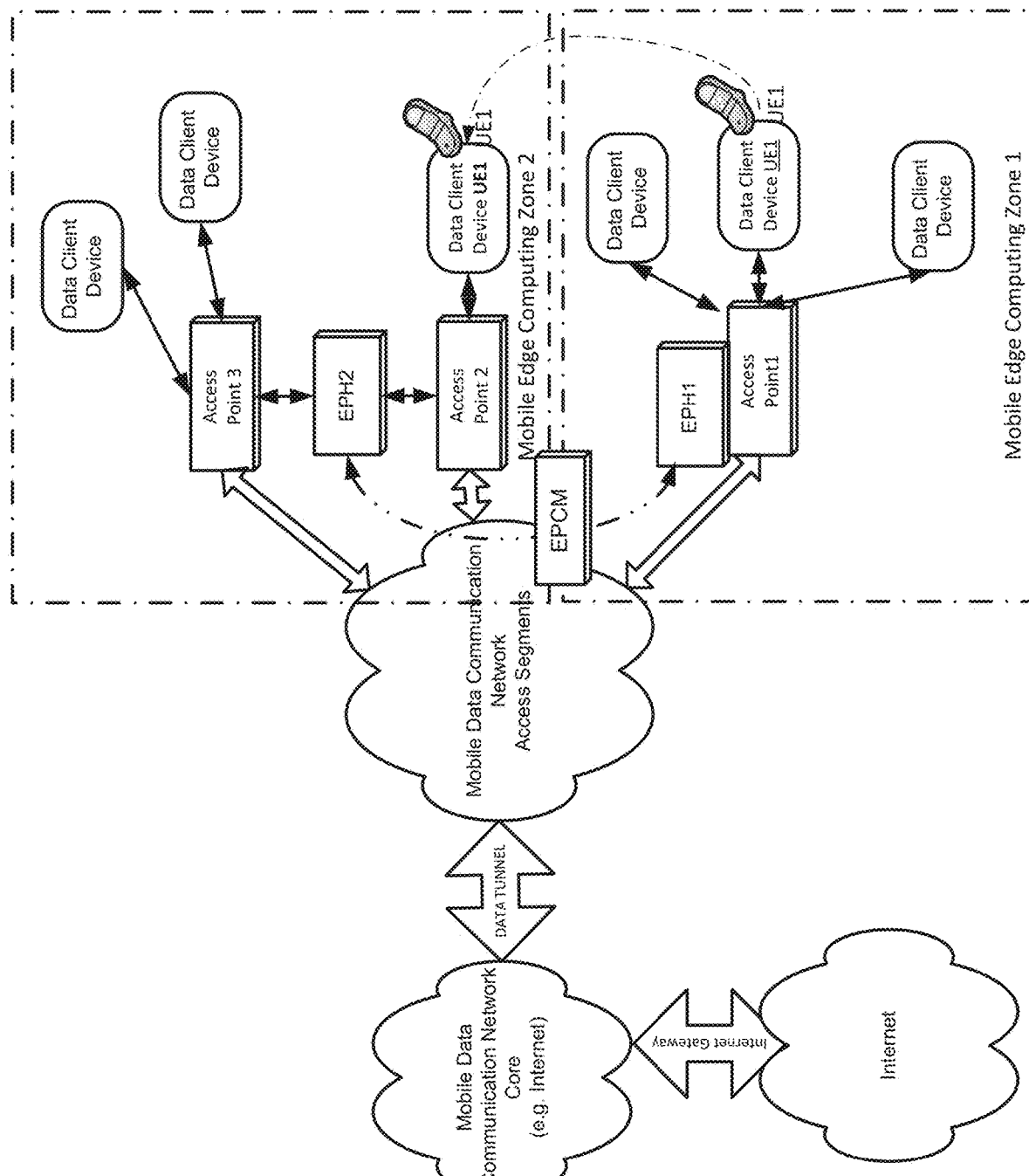
FIG. 1A shows a functional block network diagram of an exemplary mobile data communication network according to embodiments of the present invention including an Edge Processing Host (EPH) connected to each of two Mobile Edge Computing (MEC) zones, wherein each EPH provides application hosting for service-side applications servicing mobile devices (User Equipment) connected to access points of its respective MEC zone, and also to mobile devices connected to access points of other MEC zones when directed by an Edge Processing Connectivity Manager (EPCM). The shown EPCM, which may be composed of Mobility Services Modules in each of the two zones (shown in FIG. 1B), facilitates a transition of an application session between Zone 1 and Zone 2 for a client application running on UE1.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

According to embodiments of the present invention, there may be provided a mobile data communication network comprising two or more Mobile Edge Computing (MEC) Zones, wherein a first MEC Zone may be communicatively coupled to a first set of network access points which are adapted to communicated with User Equipment (UE), and the zone may include at least one Edge Processing Host adapted to run a server-side application accessible to a client application running on an EU connecting to the network through a network access point of the first set of network access points. The network may include an Edge Processing Connectivity Manager ("EPCM") to provide application session continuity for a communication session between the client application of the UE and the server-side application of the first MEC zone when the UE switches its network connection from an access point of said first MEC zone to an access point communicatively coupled to a second MEC zone. The second MEC zone may be communicatively coupled to a second set of network access points which are adapted to communicated with User Equipment (UE), and the second MEC may include at least one Edge Processing Host adapted to run a server-side application accessible to a client application running on an EU communicating with a network access point of the second set of network access points.

According to embodiments, the EPCM may be comprised of Mobility Services modules running within each of said first and second MEC zones, wherein said Mobility Services modules may communicate with one another using cross-zone communication paths, for example through a cross-MEC gateway.

The EPCM may provide application session continuity for the UE client application and the server-side application running on an EPH of said first MEC zone by bridging application session packets between said second MEC zone and said first MEC zone. Bridging application session packets between said second MEC zone and said first MEC zone may include detecting that client application packets of the UE are related to a server-side application session running on a EPH in another MEC zone, poling one or more other MEC zones to determine in which MEC zone the intended application session is running, and establishing network address translation and transport the two MEC zones. The EPCM may be comprised of a Mobility Services module within said first MEC zone in collaborative communication and operating in concert with a Mobility Services module within said second MEC.

The EPCM may provide application session continuity for the UE client application and the server-side application running on an EPH of said first MEC zone by copying application session data from said EPH of said first MEC zone to an EPH of said second MEC zone. Copying application session data from said EPH of said first MEC zone to an EPH of said second MEC zone may include detecting at said second MEC zone that client application packets of the client application on the UE are related to a server-side application session running on a EPH in another MEC zone, poling one or more other MEC zones to determine in which MEC zone the intended application session is running, requesting the application session data from said first MEC zone and instancing on said EPH of said second MEC zone an application session based on the application session data requested from said first MEC zone. The copied application session data may be selected from the group of data consisting of: (a) application session state data, and (b) at least a partial application image snapshot of the server-side application running on said EPH of said first MEC zone. The EPCM may be comprised of a Mobility Services module within said first MEC zone in collaborative communication and operating in concert with a Mobility Services module within said second MEC.

Turning now to FIG. 1A, there is shown a functional block network diagram of an exemplary mobile data communication network according to embodiments of the present invention including an Edge Processing Host (EPH) in each of two Mobile Edge Computing (MEC) zones, wherein each EPH provides application services to mobile devices (User Equipment) connected to access points of its respective MEC zone and to mobile devices connected to access points of other MEC zones at the direction of an Edge Processing Connectivity Manager (EPCM).

The EPCM may provides application session continuity for an application running on a UE and the server-side application running on the EPH of the first MEC zone by bridging or transferring application session information from said first MEC zone and said second MEC zone. Bridging or transferring application session information between the first MEC zone and the second MEC zone includes detecting that the connection to the UE (e.g. UE1) on which the client application is running is about to be handed over to an access point (base-station) in a different MEC zone which is associated with or includes a server-side application instance running on a different EPH in the another MEC zone (Step 100, FIG. 3).

Figure 1B:
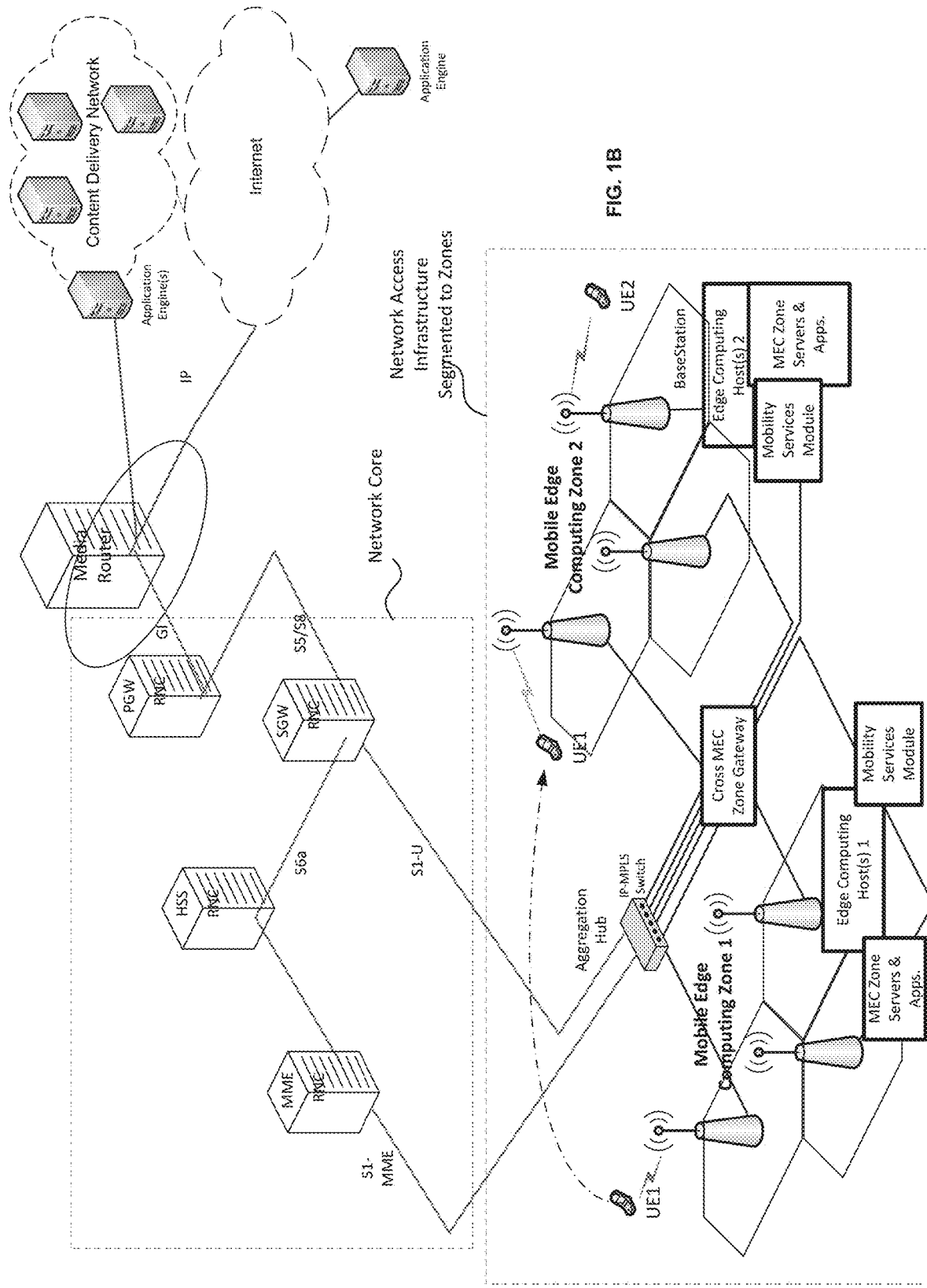
FIG. 1B shows a network diagram of an exemplary cellular network with two MEC zones, each of which zones includes Edge Computing Hosts integral or otherwise functionally associated with Mobility Services Modules and computing resources. The Mobility Services Modules in each zone coordinate with each other to facilitate a transition of an application session between Zone 1 and Zone 2 for a client application running on UE1.

The EPCM of FIG. 1A may be comprised of a Mobility Services Module within said first MEC zone in collaborative communication and operating in concert with a Mobility Services Module within said second MEC zone. FIG. 1B shows a network diagram of an exemplary cellular network with MEC zones, each of which MEC zones is associated with several base-stations and includes an EPH (also referred to as Mobile Edge Computing Platform) with one or more MEC servers and a Mobility Services Module running thereon. The network of FIG. 1B also shows a cross-MEC zone gateway to facilitate a communication path, for signaling and application session related packet transfer, between the first and second MEC zones.

Figure 2:
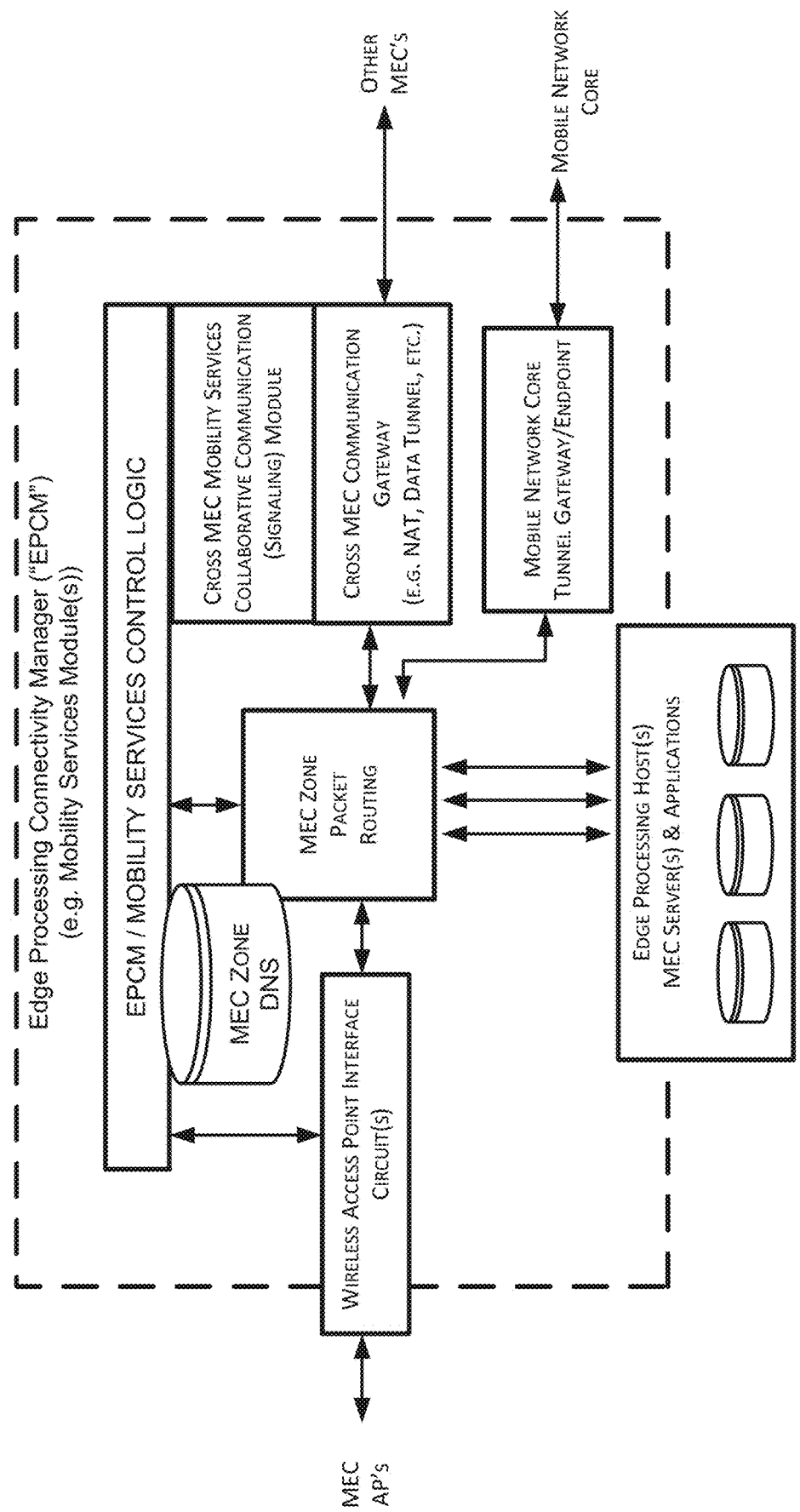
FIG. 2 shows a functional block diagram of at least a portion of an exemplary Edge Processing Connectivity Manager (EPCM) according to embodiments of the present invention wherein the EPCM is comprised of Mobility Services modules integral or otherwise functionally associated with one or more access points of an MEC zone, and wherein the EPCM provides application session continuity by transferring and or bridging application session information between two or more different MEC zones, such as for example by copying application session data (State and Client ID) from an EPH/MEC-Server of one MEC zone to an EPH/MEC-Server of another MEC zone.

Turning now to FIG. 2 there is shown a functional block diagram of at least a portion of an Edge Processing Connectivity Manager (EPCM) according to embodiments of the present invention, wherein the EPCM is comprised of Mobility Services Modules integral or otherwise functionally associated with one or more MEC zones and wherein the EPCM provides application session continuity by bridging or just selectively transferring application session related packets between MEC zones. The EPCM may include or otherwise provide Mobility Services Module functionality for one specific MEC zone or for a set of zones and it has interfaces to receive packets from UE's connected to associated access points, an MEC zone DNS with routing packet information, an interfaces to MEC zone EPH's, an interface to the network cored, an interface to a gateways of other MEC zones, a packet routing module, and a controller to regulate application session related data transfer or routing based on actual network locations of the source and target servers for the server session information.

Figure 3:
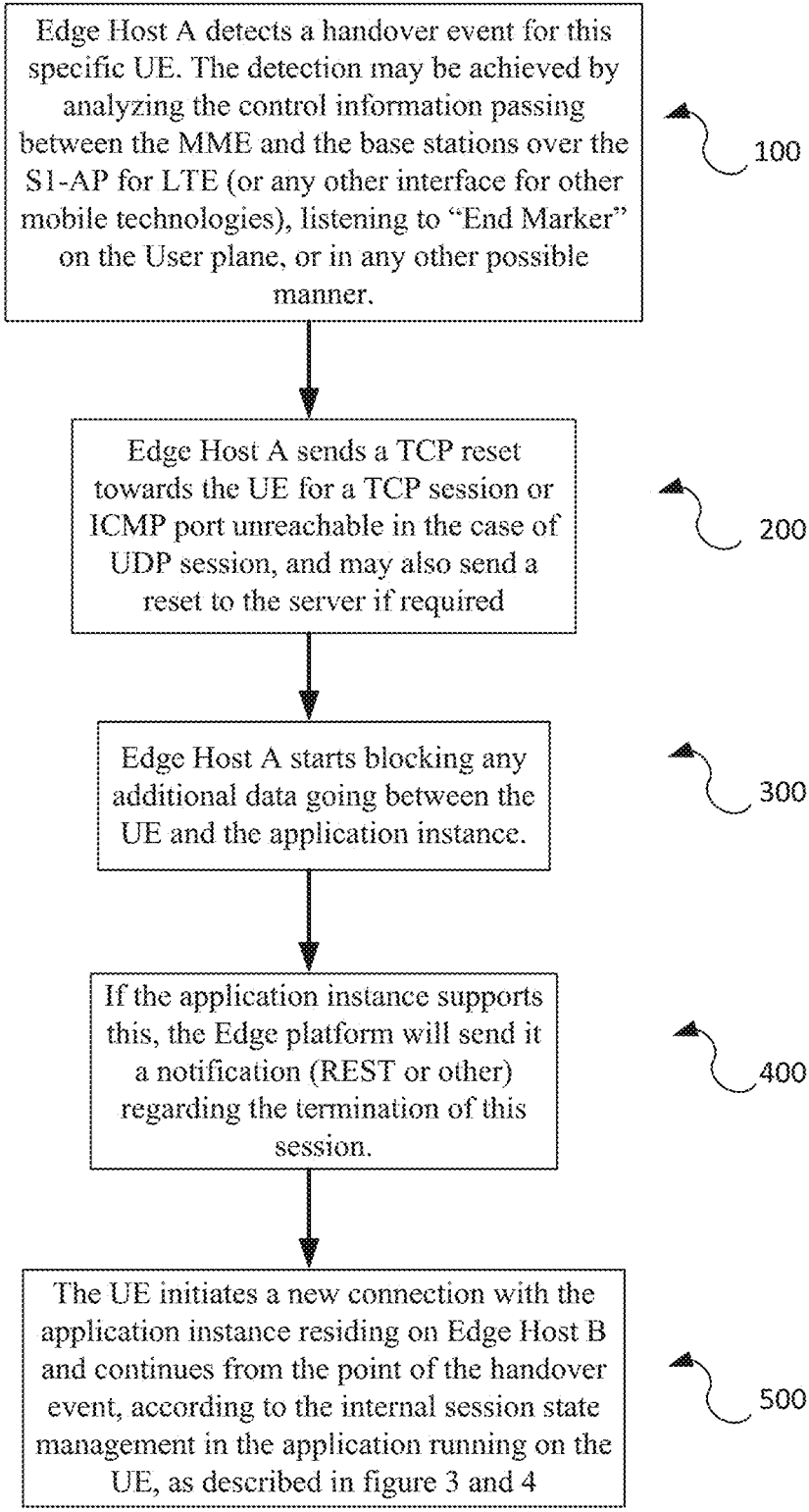
FIG. 3 is a flowchart including steps of an exemplary set of steps performable to maintain application session continuity in accordance with embodiments of the present invention.

Exemplary operation of the EPCM of FIG. 2 may be described with reference to the steps in the flowchart of FIG. 3 and in view of the illustrations of FIGS. 4A to 4E, which collectively list and illustrate a sequence of steps for bridging or transferring server-client application session related data packets between EPH's of two separate MEC zones as an UE switches between the two MEC zones according to embodiments of the present invention The user equipment seen in FIG. 4A has a known IP address (IPV4 or IPV6) and is connected to a local application, running on resources associated with Edge Host A or MEC Zone A. The application may be virtualized on a Virtual Machine, virtualized on a container or running native over the Operating System of an edge server. This server, on an EPH or the like, could be any kind of server running any kind of operating system using any kind of virtualization. Although the model for Mobile Edge Computing (MEC) is used as the example throughout this application, it is also applicable for any NFV/SDN architecture. When the UE is moving in the network it might migrate into a new MEC ZONE which is serviced by different MEC server types. As seen in FIGS. 1A & 1B, to support mobility, an MEC interconnection through a grid or zone gateway is provided. The MEC grid may connect all MEC server that are part of a MEC Mobility Group—MMG. The MMG is a collection of all MEC zones and respective servers that a UE might migrate to when it is connected to a specific MEC zone, for example, if a UE is connected to MEC-X and under the mobility options the UE can migrate to either MEC-Y, MEC-Z or MEC-J it is said that the MMG of MEC-X includes MEC-Y, MEC-Z and MEC-J and they are the only members in the group. The MMG supports IP Multicast between group members—it is possible practice to implement this channel over a dedicated IGMP address per MMG.

Figure 4C:
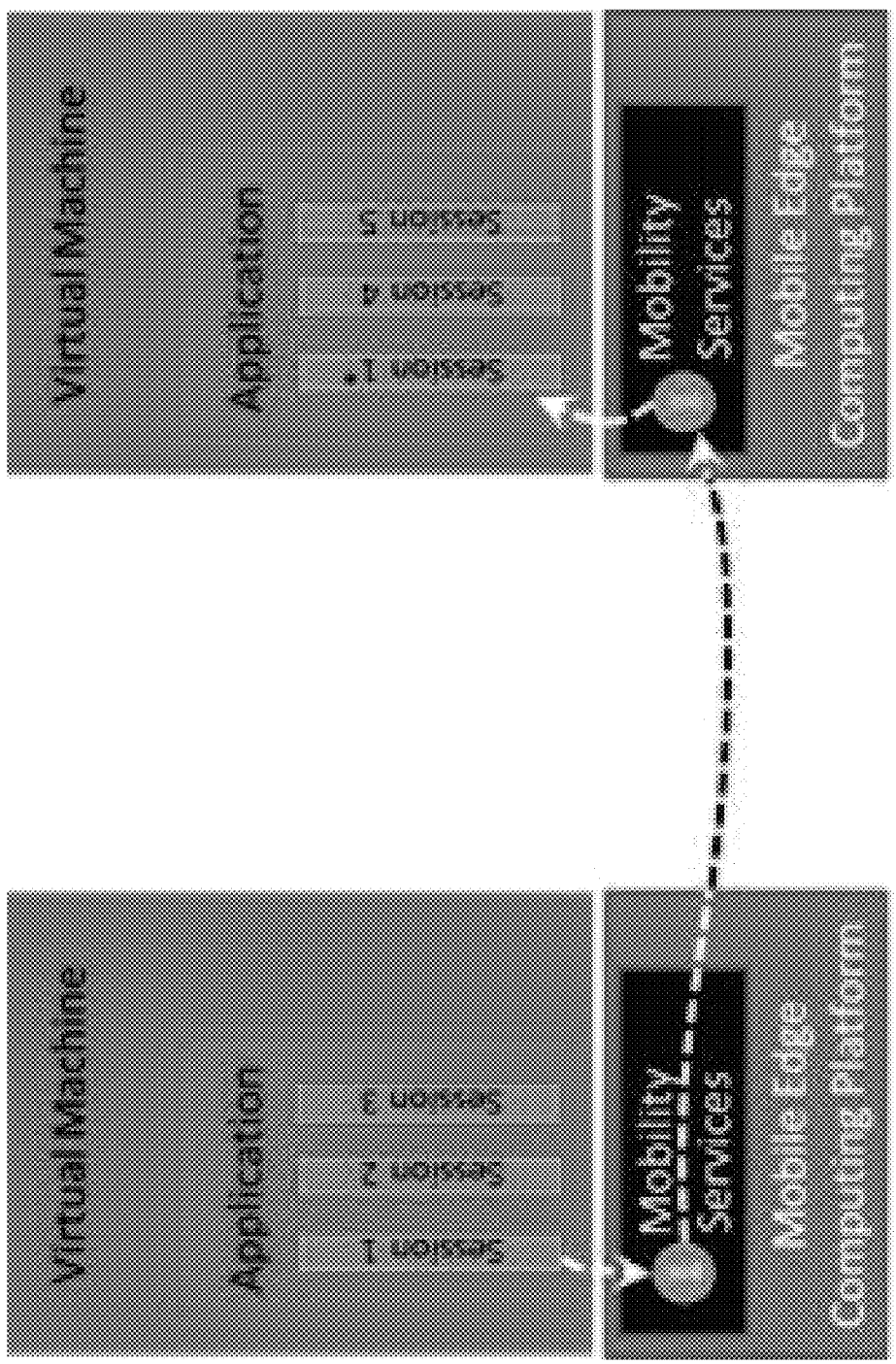
FIG. 4C is functional block diagram illustration of an example embodiment by which a server application session, corresponding to a client application session on the mobile computing device (UE) which moved from one MEC zone to another, is transferred from an original MEC zone to a destination MEC zone.

When the UE of FIGS. 4A and 4B is being handed over from Zone A to Zone B related access points, a connection between a client application on the UE and a server application running on Zone A computing resources is disrupted. As part of step (FIG. 3 Step 100) this handover is detected by the EPCM (FIG. 2) through its various interfaces, which EPCM is part of the Edge platforms of Zone A and or Zone B in FIGS. 3 to 4E. The EPCM starts an application session data transfer process (FIG. 3 Steps 200 to 500) from an application resource in Zone A to an Application Instance in Zone B. Examples of such transfer are illustrated in FIGS. 4C and 4D. Once the transfer is completed, the application on the UE can reconnect with an instance of the server application, as illustrated in FIG. 4E, which appears and behaves the same as the previous server application instance in Zone A. Accordingly, the UE handover from Zone A to Zone B may be transparent to the client application running on the UE.

Turning back to FIG. 2, there is shown a functional block diagram of at least a portion of an exemplary Edge Processing Connectivity Manager (EPCM) according to embodiments of the present invention, wherein the EPCM is comprised of Mobility Services modules or features. The EPCM may be integral or otherwise functionally associated with one or more access points of an MEC zone and the EPCM provides application session continuity by copying application session data from an EPH of one MEC zone to an EPH of another MEC zone. The EPCM can be part of or functionally associated with an MEC zone platform or may be composed of portions of several MEC zone platforms. The EPCM may include or otherwise use a cross MEC zone gateway to transfer information between Mobility Services Modules/Features operating in different MEC zones. The EPCM session information copying and loading module interface or otherwise functionally associated with the EPH to which it is connected. Application session data copying operation of the EPCM of FIG. 2 can be described with reference to FIGS. 4C and 4D which illustrate copying of application session data between two MEC zones as a UE switches MEC zones according to embodiments of the present invention. FIG. 4C illustrates an example where the server-side application is located within a virtual machine of the original MEC zone. The MEC zone server(s) includes a Mobility Service (MS). The MS has an API towards the applications in which the relevant applications are required to save the following: (1) The IP 5 tuple of the session managed; (2) The unique identifier of the Application; (3) The required Mobility Action (as described above); and (4) The application is also allowed to save proprietary information that in case of Application Mobility will allow is to restore the full status of the Application and the specific session or sessions within the application.

When an Application Mobility response is sent, the new MEC server will do the following: (1) If the required application is not running on the new MEC, the MEC server will activate this application; (2) The new MEC server will transfer the proprietary information saved by the application on the Previous MEC server; (3) The new MEC server will alert the running application of the session or sessions regarding the mobility events; (4) The new MEC server will initiate a TCP/UDP connection towards the Application; (5) The new MEC server will proxy the TCP/UDP connection towards the application so the connection towards the UE will not be affected by means of correcting sequence, numbers time-stamps, indexes and etc. Once all is completed the UE is connected to the application running over the new MEC server of the new MEC zone.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A mobile data communication network comprising:
two or more Mobile Edge Computing (MEC) Zones, wherein a first MEC Zone: (a) is communicatively coupled to a first set of network access points to communicate with User Equipment (UE); and (b) includes at least one Edge Processing Host (EPH) to run a server-side application accessible to a client application running on an UE connecting to said network through a network access point of the first set of network access points;
an Edge Processing Connectivity Manager ("EPCM") to provide application session continuity for a communication session for client application of the UE when the UE switches its network connection from an access point of said first MEC zone to an access point communicatively coupled to a second MEC zone by causing a transfer of application session state data from the server-side application engaged in the communication session between said Edge Processing Host of said first MEC to another Edge Processing Host associated with said second MEC zone.

2. The mobile data communication network according to claim 1, wherein said second MEC zone: (a) is communicatively coupled to a second set of network access points to communicate with User Equipment (UE); and (b) includes at least one Edge Processing Host to run a server-side application accessible to a client application running on an UE communicating with a network access point of the second set of network access points.

3. The mobile data communication network according to claim 2, wherein said EPCM is comprised of Mobility Services modules running within each of said first and second MEC zones, wherein said Mobility Services modules communicate with one another using cross-zone communication paths.

4. The mobile data communication network according to claim 2, wherein said EPCM provides application session continuity for the UE client application and the server-side application running on an EPH of said first MEC zone by bridging application session related packets between said second MEC zone and said first MEC zone.

5. The mobile data communication network according to claim 4, wherein said EPCM is comprised of a Mobility Services module within said first MEC zone in collaborative communication and operating in concert with a Mobility Services module within said second MEC.

6. The mobile data communication network according to claim 2, wherein said EPCM provides application session continuity for the UE client application and the server-side application running on an EPH of said first MEC zone by copying application session data from said EPH of said first MEC zone to an EPH of said second MEC zone.

7. The mobile data communication network according to claim 6, wherein the copied application session data is selected from the group of data consisting of: (a) application session state data, and (b) at least a partial application image snapshot of the server-side application running on said EPH of said first MEC zone.

8. The mobile data communication network according to claim 7, wherein said EPCM is comprised of a Mobility Services module within said first MEC zone in collaborative communication and operating in concert with a Mobility Services module within said second MEC.

* * * * *